United States Patent
Jones, Jr. et al.

(10) Patent No.: US 10,464,496 B2
(45) Date of Patent: Nov. 5, 2019

(54) QUICK HITCH MOUNT

(71) Applicant: MultiCraft Ventures, LLC, Pelahatchie, MS (US)

(72) Inventors: Paul H. Jones, Jr., Canton, MS (US); Tommy E. Nichols, Jr., Brandon, MS (US); Charles D. Flumm, Brandon, MS (US)

(73) Assignee: Multicraft Ventures, LLC, Pelahatchie, MS (US)

( * ) Notice: Subject to any disclaimer, the term of this patent is extended or adjusted under 35 U.S.C. 154(b) by 0 days.

(21) Appl. No.: 15/601,574

(22) Filed: May 22, 2017

(65) Prior Publication Data

US 2018/0333998 A1     Nov. 22, 2018

(51) Int. Cl.
| | | |
|---|---|---|
| *B60R 9/045* | (2006.01) | |
| *B60D 1/58* | (2006.01) | |
| B60D 1/54 | (2006.01) | |
| B60D 1/00 | (2006.01) | |

(52) U.S. Cl.
CPC .............. *B60R 9/045* (2013.01); *B60D 1/58* (2013.01); *B60D 2001/005* (2013.01); *B60D 2001/546* (2013.01)

(58) Field of Classification Search
CPC . B60D 1/155; B60D 1/02; B60D 1/58; B60D 2001/546; B60D 2001/005; B60R 9/06; B60R 9/08; B60R 9/045
USPC ............... 224/519–521, 282, 502, 504, 553; 403/99, 101, 116, 161, 95, 93, 91; 16/323–325, 333, 321, 326, 335, 343
See application file for complete search history.

(56) References Cited

U.S. PATENT DOCUMENTS

| | | | |
|---|---|---|---|
| 2,470,531 A | 5/1949 | Suhl et al. | |
| 4,234,284 A | 11/1980 | Hauff | |
| 4,256,320 A | 3/1981 | Hager | |
| 4,593,840 A | 6/1986 | Chown | |
| 4,611,721 A * | 9/1986 | Heckaman | A47G 25/746 211/100 |
| 4,744,590 A | 5/1988 | Chesney | |
| 4,802,686 A | 2/1989 | Isreal | |
| 5,190,195 A * | 3/1993 | Fullhart | B60R 9/10 224/497 |
| 5,368,209 A | 11/1994 | Hill | |
| 5,730,456 A | 3/1998 | Bowers | |

(Continued)

OTHER PUBLICATIONS

International Search Report and Written Opinion for PCT/US2017/042631, dated Nov. 9, 2017, 12 pages.

*Primary Examiner* — Scott T McNurlen
(74) *Attorney, Agent, or Firm* — Blank Rome LLP (57) ABSTRACT

A hitch mount connects a vehicle accessory to a vehicle hitch. The hitch mount has a first arm configured to be received by the vehicle hitch, an elongated second arm rotatably connected to the first arm, and a third arm or mounting plate on the vehicle accessory and rotatably connected to the second arm. The hitch mount has a locked position whereby the second arm cannot be rotated with respect to the first arm or the third arm, and an unlocked position whereby the second arm can rotate with respect to the first arm and the third arm. The vehicle accessory can be positioned near the vehicle hitch and the first arm slidably received in and locked to the vehicle hitch. The vehicle accessory can then be lifted upward and the second arm locked to prevent rotation of the second arm with respect to the first and third arms.

11 Claims, 9 Drawing Sheets

(56) References Cited

U.S. PATENT DOCUMENTS

| | | |
|---|---|---|
| 6,406,051 B1 | 6/2002 | Phillips |
| 6,725,855 B1 | 4/2004 | Brennan |
| 7,249,771 B1 | 7/2007 | Brennan |
| 7,641,235 B1 | 1/2010 | Anduss |
| D634,260 S | 3/2011 | Farber |
| 8,061,572 B2 | 11/2011 | Myrex |
| 8,079,614 B1 | 12/2011 | Bui et al. |
| 8,408,578 B2 | 4/2013 | Staples |
| 8,720,933 B2 | 5/2014 | Raider et al. |
| 2004/0025795 A1 | 2/2004 | Miale |
| 2004/0080149 A1 | 4/2004 | Martin |
| 2004/0173654 A1 | 9/2004 | McAlister |
| 2006/0145461 A1 | 7/2006 | Anderson |
| 2009/0232633 A1 | 9/2009 | Stamps et al. |
| 2009/0321480 A1* | 12/2009 | Kincaid ............... F41C 33/0227 224/243 |
| 2010/0096424 A1* | 4/2010 | Kuschmeader ........... B60R 9/06 224/509 |
| 2011/0210152 A1 | 9/2011 | Williams |
| 2014/0169921 A1 | 6/2014 | Carey |
| 2015/0042071 A1 | 2/2015 | Hamm |
| 2017/0001575 A1* | 1/2017 | Ackeret ................. B60R 11/00 |

* cited by examiner

QUICK HITCH MOUNT

BACKGROUND OF THE INVENTION

Field of the Invention

The present invention relates to a vehicle hitch mount. More particularly, the present invention relates to a quick hitch mount that removably attaches a vehicle accessory to a vehicle hitch.

Background of the Related Art

Many vehicles are fitted with a hitch that attach a vehicle accessory, such as a trailer, bike rack, cooking apparatus, chair, or cargo carrier. The vehicle accessory includes a mount that is received by the vehicle hitch to attach the vehicle accessory to the vehicle hitch. However, the mount can be awkward and difficult to attach to the vehicle hitch.

Accordingly, there is a need for a mount that can be fitted to a vehicle accessory and is easy to connect to the vehicle hitch. In addition, there is a need for a mount that is easy to use but provides reliable attachment of the vehicle accessory to the vehicle mount.

SUMMARY OF THE INVENTION

Accordingly, it is one object of the invention to provide a hitch mount that is easy to use and can be placed in a locked position and an unlocked position by moving the vehicle accessory. It is a further object of the invention to provide a hitch mount that can be reliably and securely locked to the vehicle hitch.

A hitch mount connects a vehicle accessory to a vehicle hitch. The hitch mount has a first arm configured to be received by the vehicle hitch, an elongated second arm rotatably connected to the first arm, and a third arm or mounting plate on the vehicle accessory and rotatably connected to the second arm. The hitch mount has a locked position whereby the second arm cannot be rotated with respect to the first arm or the third arm, and an unlocked position whereby the second arm can rotate with respect to the first arm and the third arm. The vehicle accessory can be positioned near the vehicle hitch and the first arm slidably received in and locked to the vehicle hitch. The vehicle accessory can then be lifted upward and the second arm locked to prevent rotation of the second arm with respect to the first and third arms.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 1:
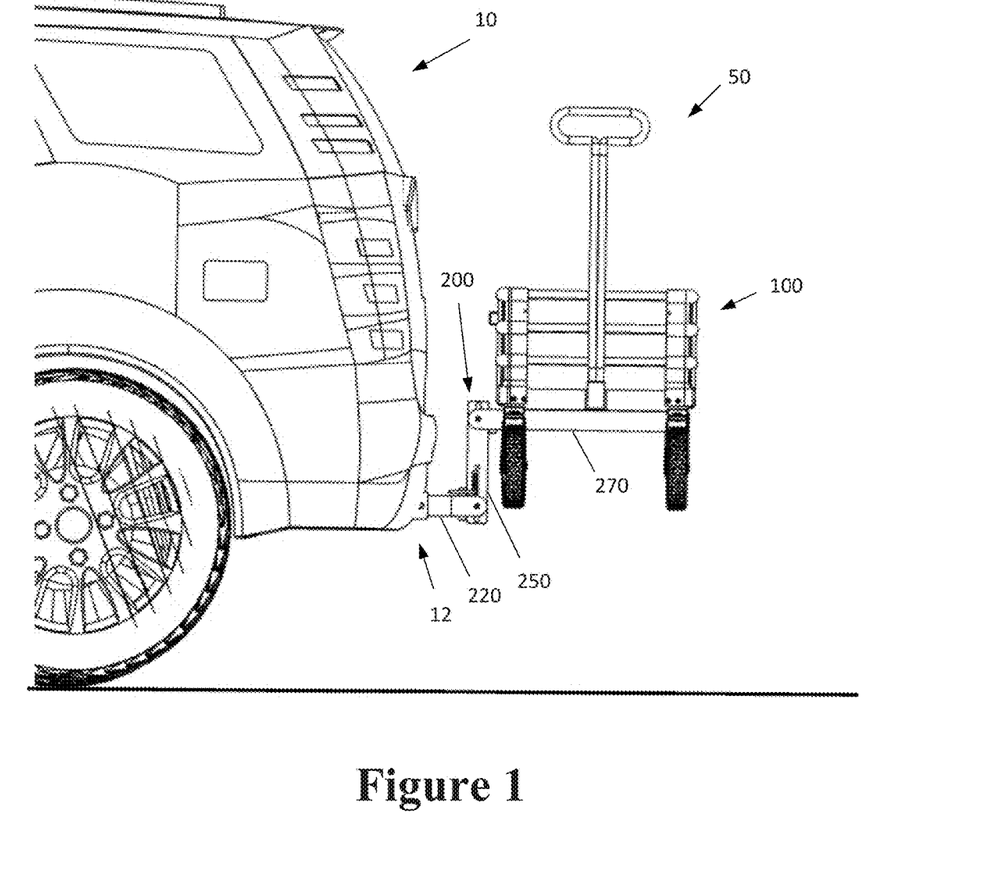
FIG. 1 is a side view of a vehicle mount system attached to a vehicle in a raised and locked position in accordance with one embodiment of the invention.
Figure 2:
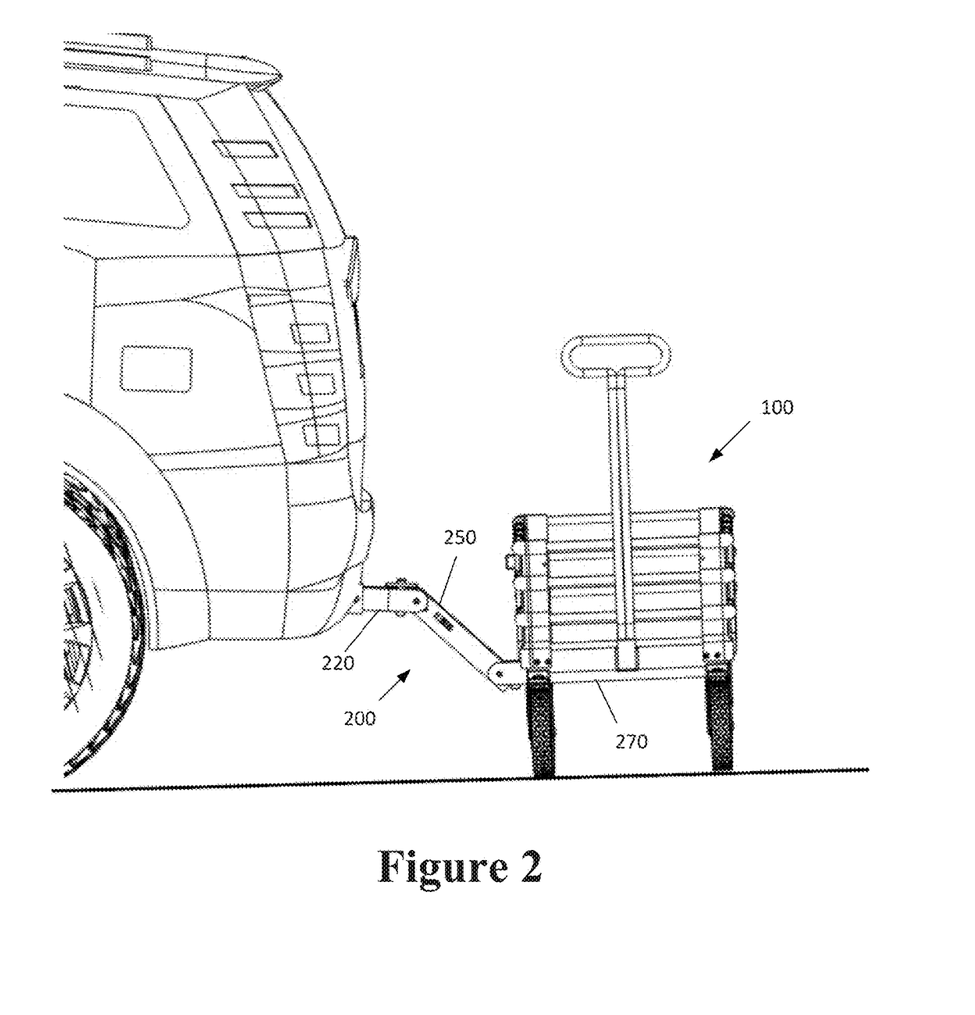
FIG. 2 is a side view of the vehicle mount system connected to the vehicle in a connect position, with the vehicle accessory lowered to the ground.
Figure 3:
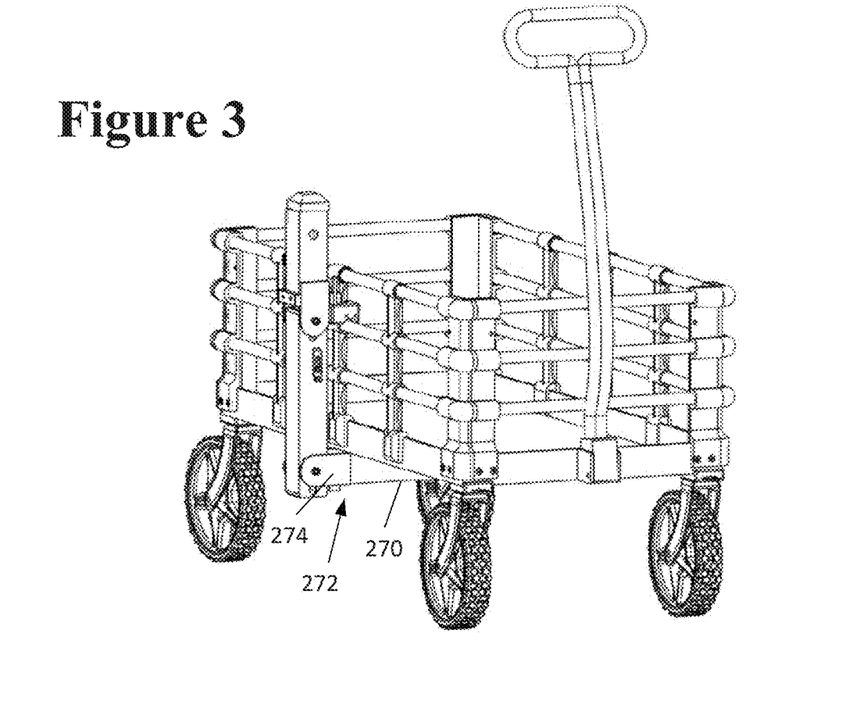
FIG. 3 is a perspective view of the vehicle mount system in a storage position.

Turning to the drawings, FIGS. 1-3 show the vehicle hitch mount 200 of the present invention for use with a vehicle accessory 100. In the example shown, the vehicle accessory is a cargo carrier. However, the vehicle hitch mount assembly 200 can be used with any suitable vehicle accessory, such as a trailer, bike carrier, cooking apparatus, or chair. The vehicle hitch mount assembly 200 and vehicle accessory 100 form a vehicle mount system 50. As shown, the vehicle hitch mount assembly 200, vehicle accessory 100 and vehicle mount system 50 are designed to be easily and reliably attached to and removed from a vehicle hitch 12 at the rear of a vehicle 10.

The vehicle hitch mount assembly 200 and vehicle mount system 50 have three positions: transport, connect, and storage. FIG. 1 shows the transport position. Here, the vehicle mount system 50 is attached to the vehicle hitch 12, and the vehicle hitch mount 100 is locked so that it cannot inadvertently move into the connect position without being moved by the user. The vehicle 10 can be driven to transport the vehicle mount system 50.

Figure 4:
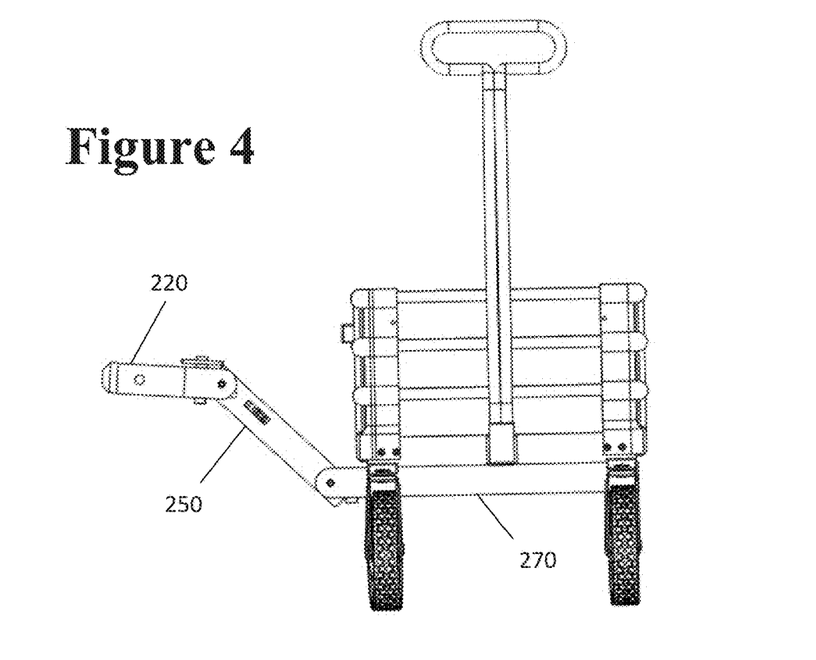
FIG. 4 is a side view of the vehicle mount system in a connect position.

FIGS. 2, 4 show the connect position of the vehicle mount system 50 and vehicle hitch mount assembly 200. Here, the system 50 and mount assembly 200 are between the transport position (FIG. 1) and the storage position (FIG. 3). The user can be in the process of connecting the system 50 and mount assembly 200 to the vehicle 10, or disconnecting the system 50 and mount 200 from the vehicle 10.

FIG. 3 shows the storage position of the vehicle mount system 50 and vehicle hitch mount assembly 200. Here, the vehicle mount system 50 is completely separated from the vehicle 10, and the vehicle mount system 200 is locked to the vehicle accessory 100. The vehicle accessory 100 can then be stored or in the case of a cargo carrier, as shown, the vehicle accessory 100 can be utilized to carry goods or the like.

As further shown in FIGS. 1-5, the vehicle hitch mount assembly 200 includes a chain having a mounting or receiving arm 220, a link arm 250, and an accessory arm 270. The receiving arm 220 removably attaches to the vehicle hitch 12. The link arm 250 is rotatably connected to the receiving arm 220 and the accessory arm 270 and controls movement of the vehicle system 50 and hitch mount assembly 200 between the transport position and the storage position. The accessory arm 270 is coupled to the vehicle accessory 100.

The hitch mount assembly 200 is shown in more detail in FIGS. 6-9. The receiving arm 220 is an elongated member with a substantially square cross section, and can be formed by walls to be hollow with a large central opening. The receiving arm 220 has a distal end 222, proximal end 226 and an intermediate portion 224 between the distal end 222 and the proximal end 226. The distal end 222 is removably and slidably received in the vehicle hitch 12. An opening 228 is located at the distal end 222 or intermediate portion 224. The opening 228 receives a pin that passes from the vehicle hitch 12 to releasably lock the receiving arm 220 to the vehicle hitch 12.

A coupling plate 232 is attached to two opposing sides of the receiving arm 220 at the proximal end 226. The plates 232 have a through-hole that receive a pin or lower axle 234 (which can be, for example, a bolt). The lower axle 234 extends through an elongated lower slot 259 in the link arm 250 and through the through-holes in each plate 232 to pivotally couple the proximal end 226 of the receiving arm 220 to the link arm 250. The lower axle 234 can slide within the elongated lower slot 259, from one end of the lower slot 259 to an opposite end of the lower slot 259.

Figure 8:
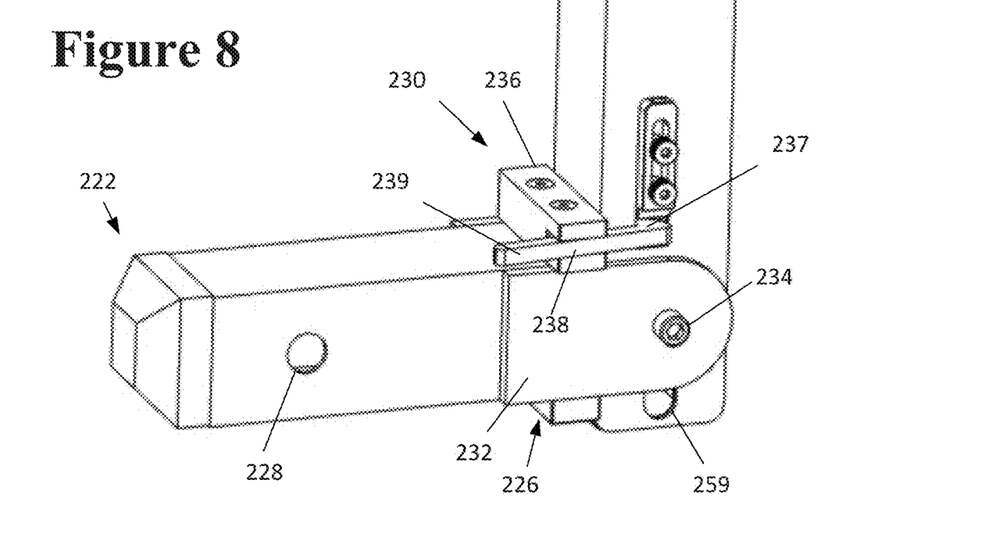
FIGS. 8-10 are enlarged perspective views of the receiving arm and the link arm in the locked position of FIGS. 1, 7.
Figure 9:
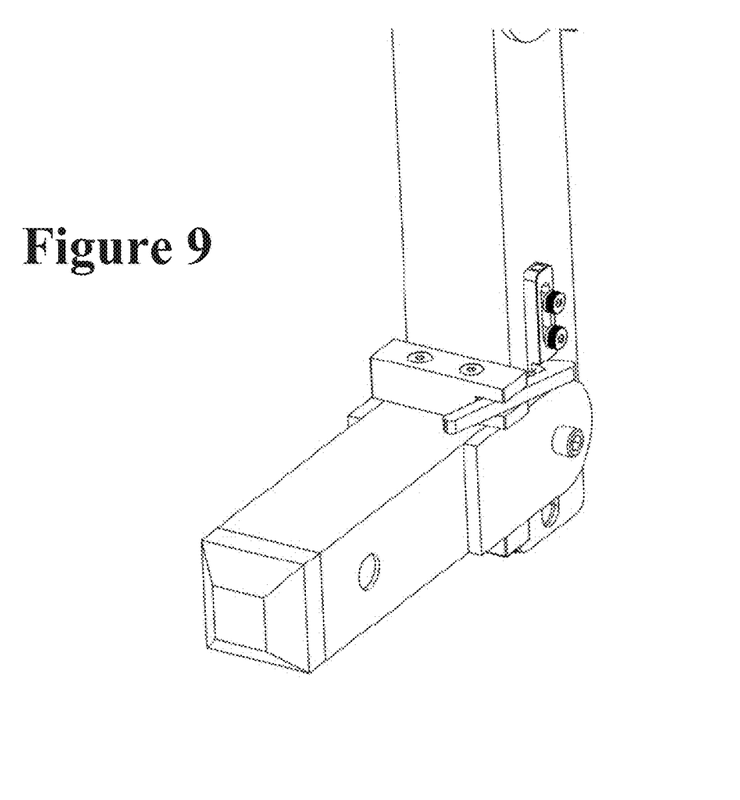

As best shown in FIG. 8, an elongated block 236 having a square-shaped cross-section is attached (e.g., by a fastener, such as a screw) at a top of the receiving arm 220 and extends across the width of the top of the receiving arm 220. A slot extends through the entire width of the block at one end of the block 236. A spring operated locking pin or hook 238 is positioned in the slot. The hook 238 is a thin elongated member with a handle 239 at one end and an enlarged head at one end comprising a projection 237 with a lip that engages the side of a lock window 262 in the link arm 250. The projection 237 can be angled so that the hook 238 can slide along the surface of the link arm 250 into the window 262. However, the head 237 is larger than the elongated opening 259 so that the head 237 does not enter into the opening 259.

Figure 7:
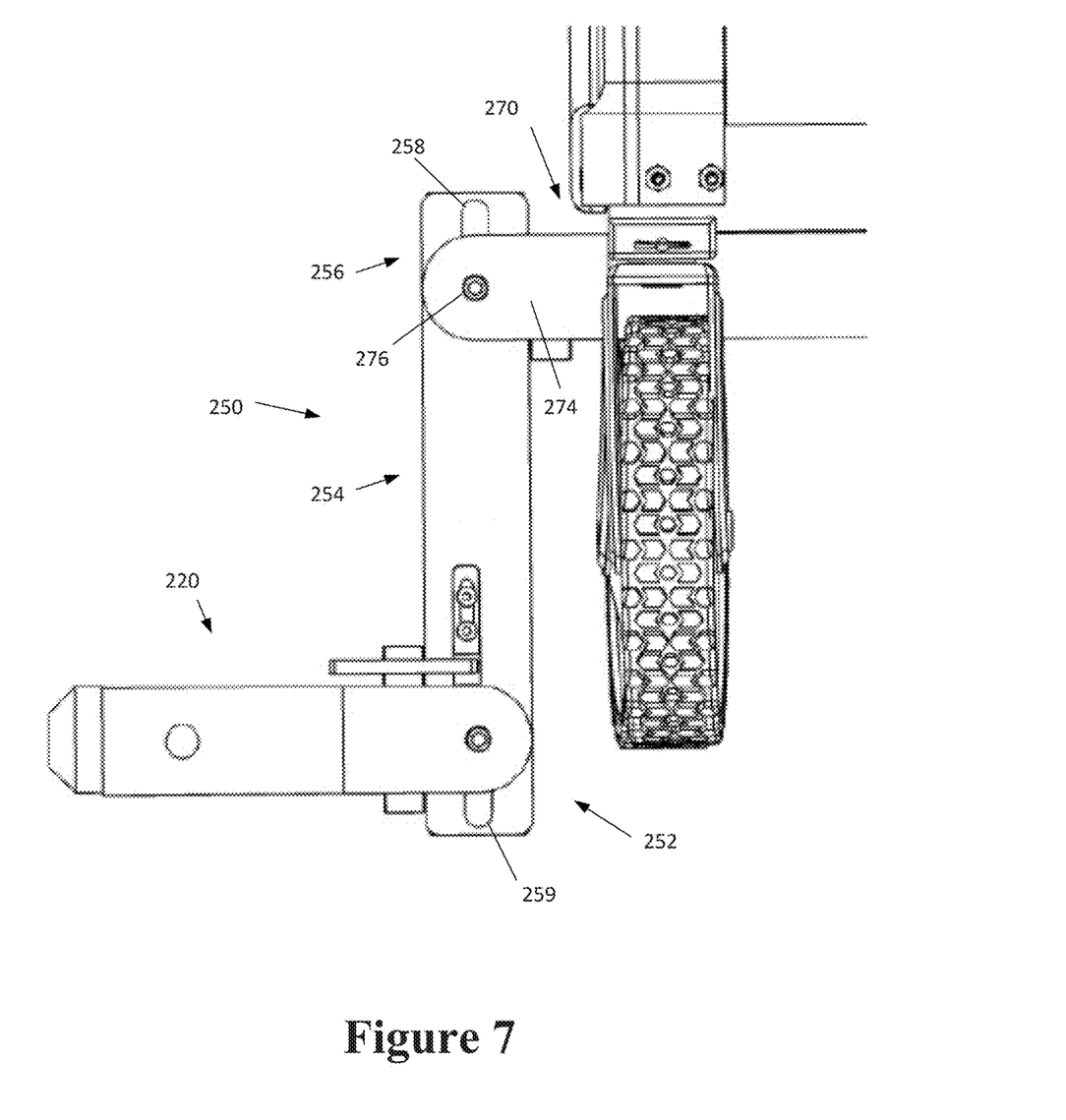
FIG. 7 is an enlarged side view of the vehicle mount system in the locked position of FIG. 1.
Figure 10:
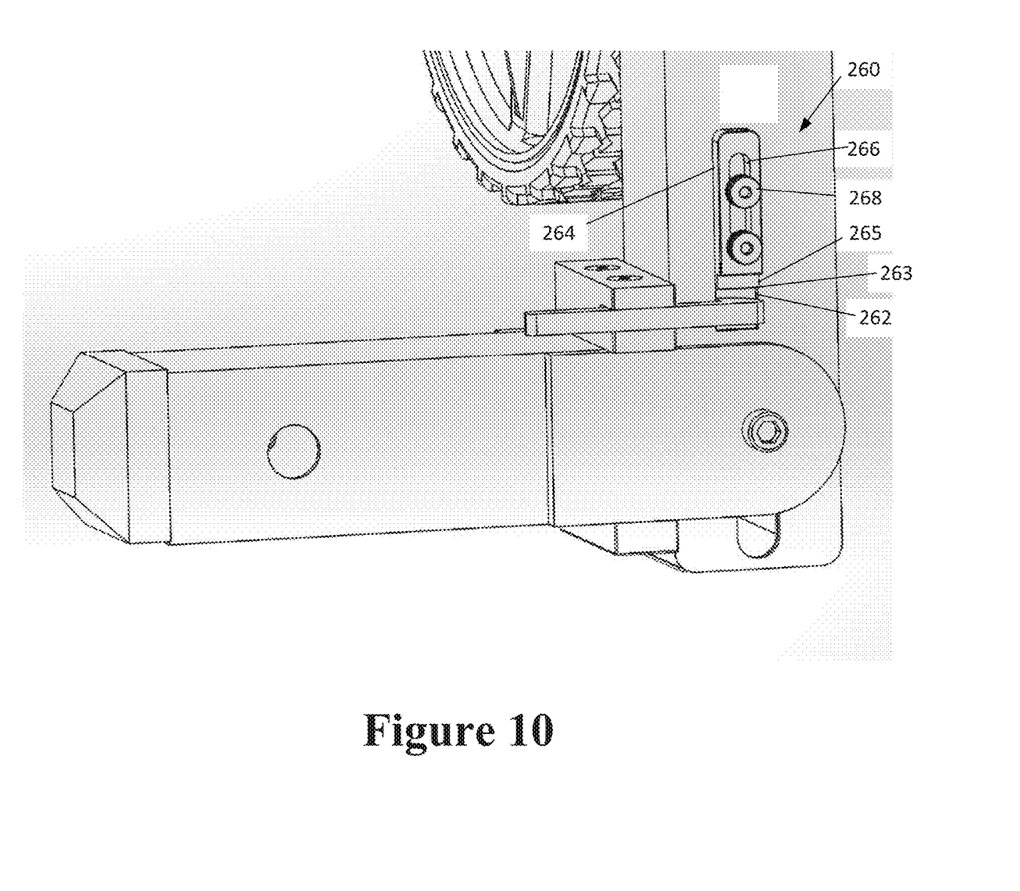
Figure 11:
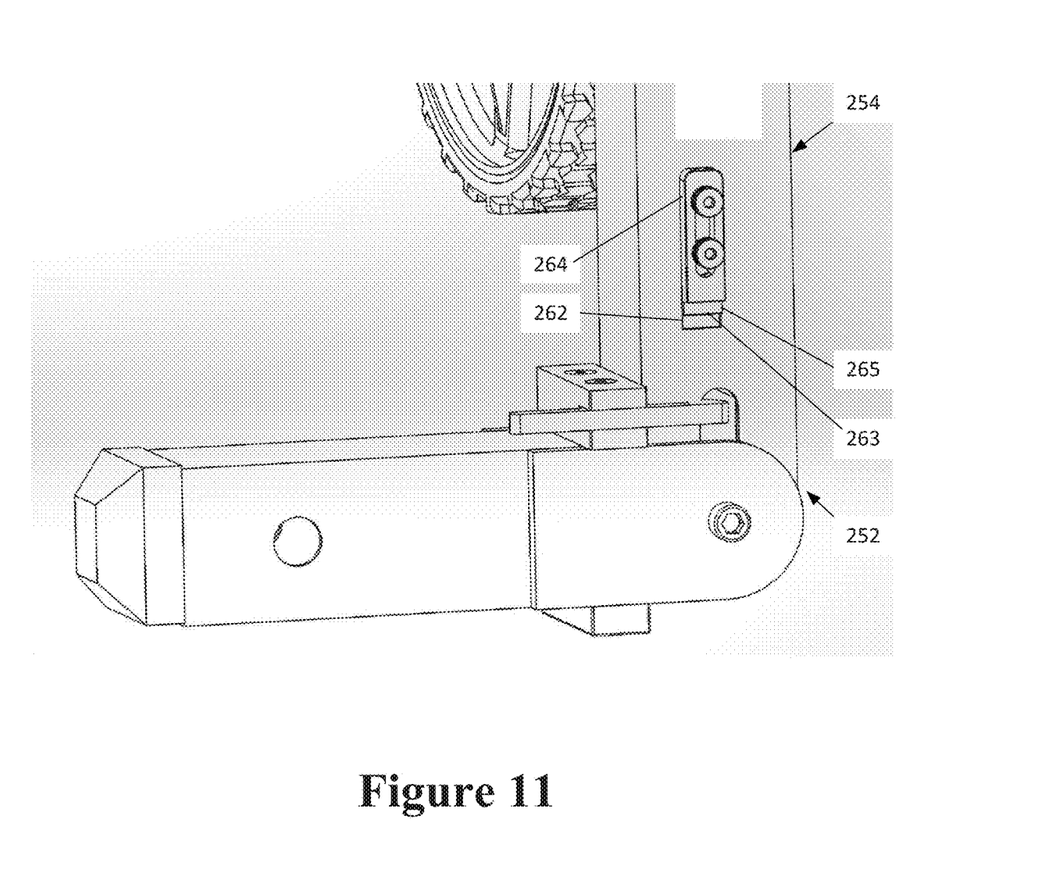
FIG. 11 is an enlarged perspective view of the receiving arm and the link arm in the pre-lock position of FIG. 5.

Turning to FIG. 7, the link arm 250 is an elongated member with a substantially square cross section, and can be formed by walls to be hollow with a large central opening. The link arm 250 has a distal end 252, proximal end 256 and an intermediate portion 254 between the distal end 252 and the proximal end 256. The proximal end 256 has a central elongated upper slot 258 with a longitudinal axis that is parallel to the longitudinal axis of the link arm 250. The distal end 252 and part of the intermediate portion 254 of the link arm 250 is best shown in FIGS. 10, 11. The distal end 252 includes the elongated lower slot 259, which has a longitudinal axis that is substantially parallel to the longitudinal axis of the linking arm 250. In addition, the hook 238 is spring operated and biased so that the head 237 moves inward against the link arm 250 and enters the lock window 262. The hook 238 can be pivotally mounted to the block 236 by extending a pivot pin through the end of the block 236 (vertically in the embodiments of FIGS. 8, 10, 11) and transversely through the hook 238. A spring can then be connected to the block 236 and the hook 238 to bias the head 237 of the hook 238.

A locking feature 260 is also provided at the distal end 252 or intermediate portion 254 of the link arm 250. The locking feature 260 includes a lock window 262, which is an opening in the link arm 250. The lock window 262 can be a small square shape that can removably receive the projection 237 of the hook 238. An elongated door plate 264 is slidably coupled to the outer surface of the link arm 250 adjacent to the lock window 262. The door plate 264 is flat and has a central slot 266. One or more fasteners 268 extend through the slot 266 and into the link arm 250. The fasteners 268 have an enlarged head to slidably couple the door plate 264 to the link arm 250. One end of the door plate 264 forms a door handle 265 that can be selectively positioned to block access to the lock window 262. The door handle 265 has a leading edge (at the bottom in the embodiment of FIG. 10) that forms a lip 263, and the door handle 265 is slightly thinner than the rest of the plate 264. A spring can be connected to the link arm 250 and to the door plate 264 to spring bias the door plate 264 to a blocking position (downward in the embodiment of FIGS. 10, 11) where the door plate 264 and handle 265 are positioned to block the lock window 262 and prevent the hook 238 from entering the lock window 262. The door plate 264 can be moved to an access position. Here, the door plate 264 is operated against the spring bias to move the door plate 264 (upward in the embodiment of FIG. 10) by sliding the door plate 264 so that the slot 266 slides under the fastener 268 heads. The door plate 264 moves with respect to the link arm 250 and the lock window 262. Thus, the door plate 264 and handle 265 move away from the lock window 262, thereby granting access to the hook 238.

Referring back to FIGS. 3 and 7, the accessory arm 270 is an elongated member with a substantially square cross section, and can be formed by walls to be hollow with a large central opening. The arm 270 is coupled to the vehicle accessory 100, such as by being welded or bolted to the frame of the accessory. The arm 270 has one end 272 that projects outward from the vehicle accessory 100. The end 272 has a mounting plate 274 at each side of the accessory arm 270 that has an opening. The opening receives a pin or axle 272 to rotatably couple the accessory arm 270 to the linking arm 250. The upper axle 276 (which can be, for example, a bolt) can also slide in the upper slot 258 of the linking arm 250.

A primary purpose of the accessory arm 270 is to rotatably couple the linking arm 250 to the vehicle accessory 100. It will be apparent that other suitable methods can be utilized to connect the linking arm 250 to the vehicle accessory 100, within the spirit and scope of the present invention. For instance, the accessory 100 can have one or more mounting plates fastened to or integral with the accessory 100, such as by being directly fastened to the frame of the accessory 100. Those plates can extend outward from the accessory 100 and rotatably couple to the linking arm 250.

Attaching the System 50 to the Vehicle 10

Operation of the system will now be discussed with respect to FIG. 3. Here, the mounting hitch assembly 200 has an L-shape. The longitudinal axis of the mounting arm 220 is substantially parallel to the longitudinal axis of the linking arm 250, so that the mounting arm 220 is linear and straight with respect to the linking arm 250. The mounting arm 220 and linking arm 250 are both substantially orthogonal with respect to the accessory arm 270. Accordingly, the accessory arm 270 extends substantially horizontally along the width of the cargo carrier 100, and the linking arm 250 and mounting arm 220 extend up along the side of the cargo carrier 100. A latch mechanism can be provided at the side of the accessory 100 to releasably lock the mounting arm 220 and/or linking arm 250 to the vehicle accessory 100. In this configuration, the accessory 100 can be used or stored, for instance the cargo carrier can be used to transport goods.

In the storage position of FIG. 3, the upper axle 276 is at the most outer part of the upper slot 258. The lower axle 234 is at the most inward part of the lower slot 259 (upward in the embodiment of FIG. 3), which prevents the link arm 250 from being rotated outward from the apparatus 100. The hook 238 is disengaged from the link arm 250 and is disengaged from the lock window 262 and the lower slot 259.

Turning to FIG. 4, the user moves the vehicle hitch mount apparatus 200 to the connect position. Here, the user disengages the arms 220, 250 from the accessory 100, lifts the link arm 250 slightly so that the lower axle 234 moves to the outermost part of the lower slot 259, and extends the link arm 250 outward away from the vehicle accessory 100. This can be done, for example, by pulling upward and then outward on the receiving arm 220 in a single continuous fluid motion. During this motion, the axles 276, 234 may freely slide within their respective slots 258, 259. The upper axle 276 allows the link arm 250 to rotate with respect to the accessory arm 270, and the lower axle 234 allows the receiver arm 220 to rotate with respect to the link arm 250. The lower axle 234 moves to the outermost (downward in the embodiment of FIG. 3) portion of the lower slot 259. And, the upper axle 276 is at the outermost (upward in FIG. 3) portion of the upper slot 258. However by virtue of the configuration of the respective arms 220, 250, 270, the lower axle 234 is not able to slide in the lower slot 259 and the upper axle 276 is not able to slide in the upper slot 258. That is because the end of the receiving arm 220 is sufficiently close to the link arm 250 that it prevents the link arm 250 from being able to rotate with respect to the receiving arm 220, and the end of the accessory arm 270 is sufficiently close to the link arm 250 to prevent the link arm 250 from being able to rotate with respect to the accessory arm 270.

As shown in FIG. 2, the user moves the accessory 100 to the back of the vehicle 10 and connects the mounting hitch apparatus 200 to the vehicle hitch 12. To do so, user rotates the receiver arm 220 and inserts it into the vehicle hitch 12. The receiving arm 220 is slidably received in the vehicle hitch 12, and a locking pin slid through the vehicle hitch 12, through the through-hole 228 (FIG. 8, to lock the receiving arm 220 (and the mounting system 200 and the vehicle hitch system 50) to the vehicle hitch 12. The link arm 250 is sufficiently long to permit the vehicle accessory 100 to comfortably rest on the ground and the user to insert the receiving arm 220 into the vehicle hitch 12.

Figure 5:
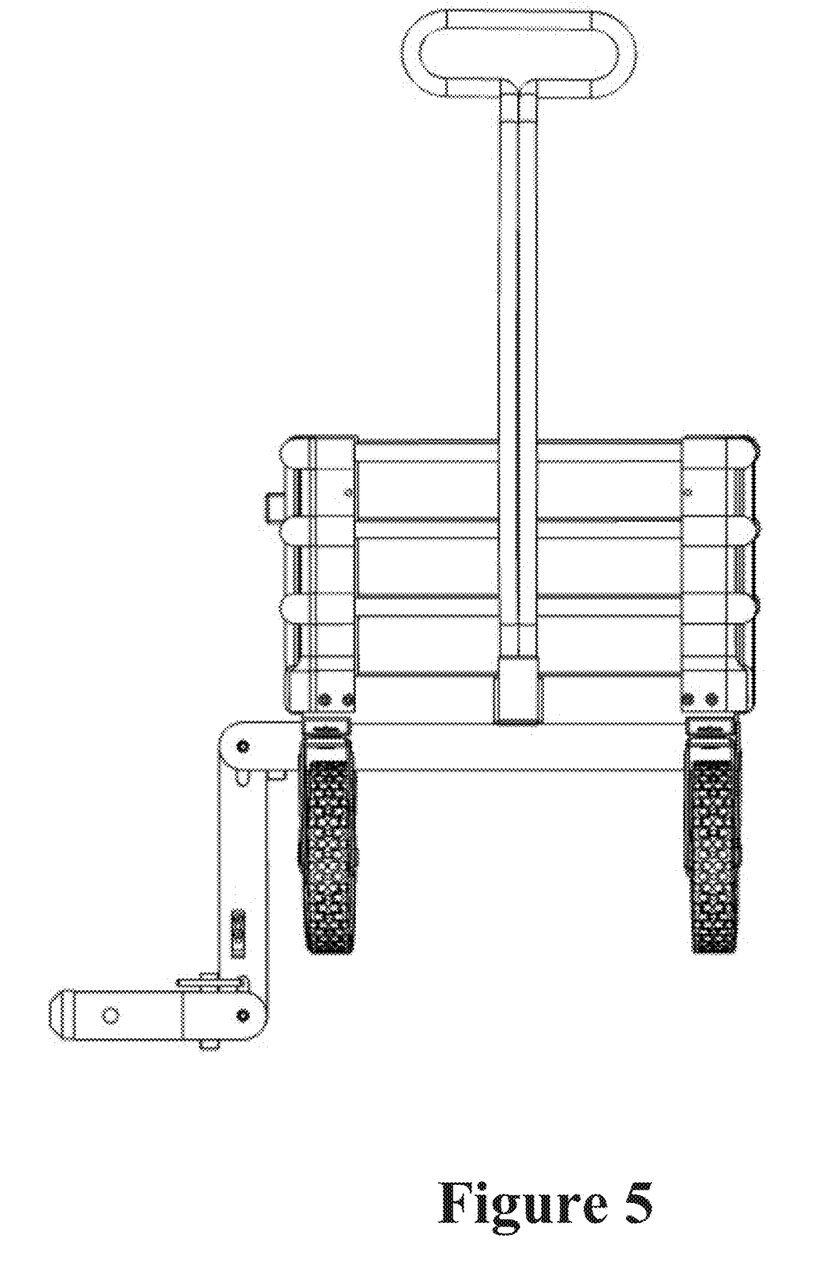
FIG. 5 is a side view of the vehicle mount system in a pre-locked position, with the vehicle removed for illustration.
Figure 6:
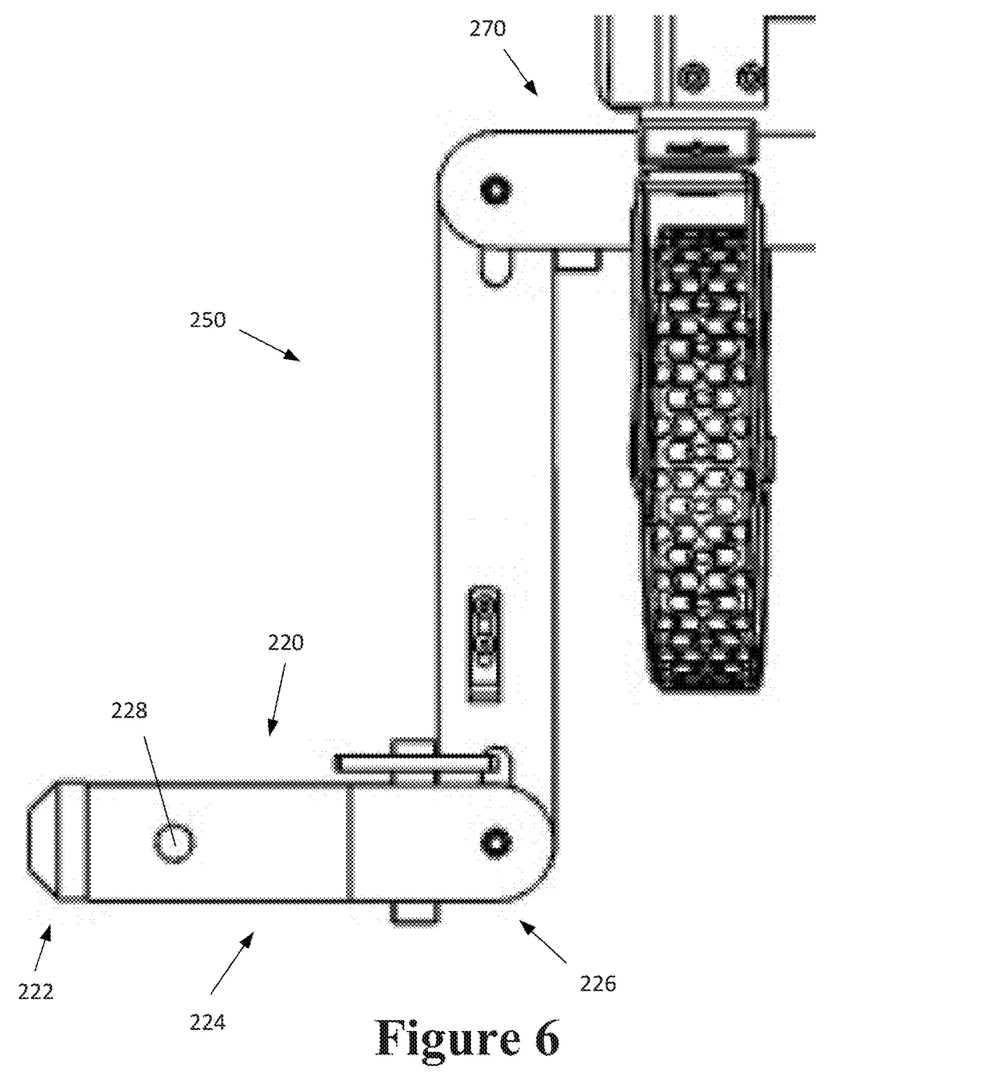
FIG. 6 is an enlarged side view of the vehicle mount system in the pre-locked position of FIG. 5.

Once the vehicle mount system 50 is attached to the vehicle 10 (FIG. 2), the user then moves the vehicle mount system 50 to the travel position. To do so, the user lifts upward on the vehicle accessory 100 and pushes the vehicle accessory 100 inward toward the vehicle 10 until the link arm 250 is substantially vertical. As shown in FIGS. 5 and 6, the receiver arm 220 and the accessory arm 270 are substantially vertical and the link arm 250 is substantially orthogonal to the receiver arm 220 and accessory arm 270. As further shown in those figures, the link arm 250 is raised with respect to the receiver arm 220, and the lower axle 234 is still at the outermost (lowest in the embodiment of FIGS. 5, 6) portion of the lower slot 259. And, the upper axle 276 is still at the outermost (highest) portion of the upper slot 258.

Referring to FIG. 11, as the link arm 250 approaches the vertical position, the locking hook arm 238 approaches the corner of the link arm 250. The angled front face of the hook 238 projection 237 comes into contact with the corner of the link arm 250, which pushes the hook 238 outward against the spring bias of the hook 238. As the link arm 250 continues toward the vertical position, the hook 238 protrusion 237 slides along the outer surface of the link arm 250 until it reaches the lower slot 259. When the link arm 250 is substantially vertical, the hook 238 can extend over the lower slot 259. However, the head 237 is larger than the lower slot 259, so that the head 237 does not enter the slot. The mount assembly 200 is now in the pre-locking position shown in FIGS. 5, 6, with the lower axle 234 still at the outermost portion of the lower slot 259 and the upper axle 276 at the outermost portion of the upper slot 258.

At the point where the link arm 250 is vertical, the orthogonal relationship of the receiver arm 220 with the link arm 250 allows the lower axle 234 to slide in the lower slot 259. And the orthogonal relationship of the accessory arm 270 with the link arm 250 allows the upper axle 276 to slide in the upper slot 258. Accordingly, the mount assembly 200 can now be moved from the pre-locking position shown in FIGS. 5, 6 to the locked position shown in FIGS. 1, 7. The user can now lower the vehicle accessory 100. During that movement, the link arm 250 slides downward, whereby the lower axle 234 moves in the slot 259 into the innermost (upper) portion of the lower slot 259, as shown in FIG. 1.

As the link arm 250 moves downward, the hook 238 approaches the locking window 262, which is blocked by the door plate 264 and handle 265. As the link arm 250 continues to move downward, the protrusion 237 on the hook 238 will come into contact with the leading edge lip 263 on the door handle 265. The door handle 265 extends over the window 262, so that the lip 263 protrudes slightly outward from the surface of the link arm 250. The hook 238 pushes against the door lip 263, which causes the door plate 264 to move upward against the spring bias of the door plate 264. Thus, the door plate 264 slides upward (in the embodiment of FIG. 11) so that the fasteners 268 are at the lower position in the slot 266, which unblocks the locking window 262. The hook 238 protrusion 237 enters the locking window 262 under the spring bias of the hook 238. The hook 238 does not ride over the top of the door handle 265, but instead pushes the lip 263 upward, which allows the head 237 to enter the window 262. The protrusion 237 on the hook 238 prevents the link arm 250 from moving away from the vertical position, prevents the lower axle 234 (and the link arm 250) from moving upward in the lower slot 259, and prevents the link arm 250 from moving away from the receiving arm 220. In addition, because the receiving arm 220 is spaced further from the distal end of the link arm 250, the receiving arm 220 also prevents the link arm 250 from moving outward away from the vertical position. Accordingly, the link arm 250 is locked to the receiving arm 220.

In addition, once the link arm 250 is vertical, the accessory arm 270 can move from an upper position to a lower position. As the user lowers the vehicle accessory 100, the upper axle 276 slides down in the upper slot 258 to a lower position, where the upper axle 276 is at the innermost portion of the upper slot 258. In the lower position, the distal end of the accessory arm 270 and the link arm 250 prevent the accessory arm 270 from moving away from the vertical position away from the link arm 250.

Accordingly, the mounting assembly 100 is in the locked travel position, as shown in FIG. 1. This is done by one single continuous fluid motion where the user lifts the vehicle accessory 100 to the pre-lock position, then allows the accessory 100 to lower down into the locking position. A single user can perform that motion by standing behind the vehicle accessory 100 (to the right in the embodiment of FIG. 1), or to one side of the vehicle accessory 100. The vehicle accessory 100 is attached to the mounting assembly 200 and the mounting assembly 200 is locked to the vehicle hitch 12. The mounting assembly 200 is locked and the linking arm 250 cannot move outward away from the vertical position. The hook 238 is locked in the locking window 262 so that the mounting assembly 200 cannot move out of the locked position and the vehicle accessory 100 cannot be lowered. The vehicle accessory 100 is raised off the ground and substantially adjacent to the vehicle. The user can now drive the vehicle 10 and the system 50 can be safely transported.

Removing the System 50 from the Vehicle 10

Once the system 50 is attached to the vehicle 10 and in a raised and locked position on the vehicle 10, the user can unlock and remove the system 50 from the vehicle 10. At this point, the mounting assembly 200 is in the locked travel position attached to the vehicle hitch 12. As shown in FIGS. 7, 8, the protruding head 237 of the hook 238 is spring biased to be received in the locking window 262 of the link arm 250. To unlock the mounting system 200, the user depresses the handle 239 of the hook 238, which withdraws the protrusion 237 from the locking window 262. The door plate 264 automatically closes under the force of the spring bias, thereby closing the window 262. The user can release the handle 239, and the head 237 of the hook 238 will come to a rest on the outer surface of the door handle 265. The door handle 265 is thinner than the rest of the plate 264 so that the head 237 does not have to travel as far to avoid excess stress on the hook spring.

However, the vehicle accessory 100 cannot be lowered to the ground yet because the configuration of the receiving arm 220 to the link arm 250 prevents the link arm 250 from rotating outward, and the configuration of the link arm 250 to the accessory arm 270 also prevents the link arm 250 from rotating outward. At this point, the user can then lift up slightly on the vehicle accessory 100. This slides the lower axle 234 downward in the lower slot 259, from the innermost portion of the slot 259 to the outermost portion of the slot, which can further unlock the receiving arm 220 from the link arm 250. As the user is raising the accessory 100, the upper axle 276 also moves upward in the upper slot 258, from the innermost portion of the slot 258 to the outermost portion of the slot 258, which can further unlock the link arm 250 from the accessory arm 270. That returns the mounting system 200 to the pre-lock position and the hook 238 is no longer aligned with the lock window 262.

At this point, the link arm 250 is no longer locked to the receiving arm 220 or the accessory arm 270. Thus, the link arm 250 can be rotated with respect to the receiving arm 220 and the accessory arm 270. The user can lower the accessory 100 to the ground. The user can pull the accessory 100 outward away from the vehicle 100, which causes the hook 238 to come free of the link arm 250. The user can then remove the pin from the pin hole 228 and pull the receiving arm 220 out of the vehicle hitch 12. Accordingly, once the user unlocks the hook 238 from the locking window 262, the user lifts the vehicle accessory 100 and pulls it outward and downward in one continuous fluid motion to lower the accessory 100 to the ground. A single user can perform that motion by standing behind the vehicle accessory 100 (to the right in the embodiment of FIG. 1), or to one side of the vehicle accessory 100.

It is noted that the invention is described as requiring the user to lift the accessory 100 to move the system 50 between the locked position and the travel position. In that embodiment, the accessory 100 is preferably made of lightweight materials, such as rigid plastic, thin metal or the like. The mounting apparatus 200 is made of metal to provide a strong and reliable connection between the vehicle hitch 12 and the accessory 100. However, it should be apparent that other suitable configurations of the invention can be utilized. For instance, a motor or pneumatics can be attached to or integral with the mounting system 200 to move the system 50 between the locked position and the travel position, so that heavier accessories 100 and accessory loads can be utilized.

Thus, the invention requires minimal user operation to move between the locked an unlocked position. When the vehicle accessory 100 is on the ground, the user only needs to raise it into the locked position and the mounting assembly 200 automatically locks to the vehicle. To unlock the mounting system 200, the user only needs to press the handle 239 of the hook 238, then raise and lower the vehicle accessory 100 to the ground. Hence, the invention is quick and easy to use and provides a secure and reliable connection.

As noted above, the mounting assembly 200 can be used with any vehicle accessory 100. The vehicle accessory 100 can be fixedly connected to the accessory arm 270, such as by welding or the like. Or the accessory 100 can have a mounting plate that selectively and rotatably engages and locks with the link arm 250. Still further, the vehicle accessory 100 can have a hitch similar to the vehicle hitch, and the accessory arm 270 can be slidably received in the accessory hitch. The accessory arm 270 can further have a pin hole that enables the accessory arm 270 to be selectively locked to the vehicle accessory hitch.

It is further noted that the description uses several geometric or relational terms, such as square, round, angled, parallel, orthogonal, and flat. In addition, the description uses several directional or positioning terms and the like, such as upper, lower, innermost, outermost, outer, left, right, up, down, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

Within this specification, the terms "substantially" means plus or minus 20%, more preferably plus or minus 10%, even more preferably plus or minus 5%, most preferably plus or minus 2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A hitch mount for connecting a vehicle accessory to a vehicle hitch, said hitch mount comprising:
   a first arm configured to be received by the vehicle hitch;
   an elongated second arm having a first end rotatably connected to the first arm, and a second end rotatably connected to the vehicle accessory, said elongated second arm having a locked position whereby the second arm is fixedly locked to the first arm in a mount position at which said second arm is positioned above and orthogonal to said first arm whereby the vehicle accessory is raised off the ground, and an unlocked position whereby the second arm can rotate with respect to the first arm and the vehicle accessory between the mount position and a dismount position at which said second arm is positioned below said first arm whereby the vehicle accessory touches the ground; and
   a third arm fixed to the vehicle accessory and rotatably connected to the second end of the second arm to rotate outward with respect to the second arm, whereby said first, second and third arms are configured so that said third arm remains substantially horizontal as said hitch mount is moved between the mount position and the dismount position;
   a lower elongated slot at the first end of said second arm, said lower elongated slot having an outer end and an inner end; and
   a lower axle extending through the lower elongated slot and the first arm to rotatably connect the second arm to the first arm and move between an innermost lower axle position at which said lower axle contacts the inner end of said lower slot and an outermost lower axle position at which said lower axle contacts the outer end of said lower slot, whereby in the locked position said lower axle is at the innermost lower axle position to support said second arm and said first arm prevents said second arm from rotating outward away from said first arm.

2. The hitch mount of claim 1, wherein in the locked position the second arm is vertical and can be moved to the unlocked position by raising said second arm to move said lower axle to the outermost lower axle position whereby the second arm can be rotated with respect to the first arm.

3. The hitch mount of claim 2, further comprising:
   an upper elongated slot at the second end of said second arm, said upper elongated slot having an outer end and an inner end;
   an upper axle extending through the upper elongated slot and the third arm to rotatably connect the second arm to the third arm and move between an innermost upper axle position at which said upper axle contacts the inner end of said upper slot and an outermost upper axle position at which said upper axle contacts the outer end of said upper slot, whereby in the locked position said upper axle is at the innermost upper axle position to support said third arm and said second arm prevents said third arm from rotating outward away from said second arm.

4. The hitch mount of claim 3, wherein in the locked position the third arm can be moved to the unlocked position by raising said third arm to move said upper axle to the outermost upper axle position whereby the second arm can be rotated with respect to the third arm.

5. The hitch mount of claim 1, wherein the second arm is extended outward away from the vehicle at a lowered position in the unlocked position, whereby the vehicle accessory is on the ground; and the second arm is in a vertical position with respect to the vehicle and the first arm in the locked position, whereby the vehicle accessory is in a raised position adjacent the vehicle and off of the ground.

6. The hitch mount of claim 1, wherein the vehicle accessory comprises a cargo carrier having a plurality of wheels.

7. The hitch mount of claim 1, said second arm having a storage position whereby said second arm in the locked position is below the third arm and in the storage position is above the third arm and along one of the sides of the vehicle accessory.

8. The hitch mount of claim 1, further comprising:
   a locking window positioned in the second arm;
   a door plate connected to the second arm and spring biased to block the locking window; and
   a locking pin connected to the first arm and having an enlarged head to selectively engage the locking window, whereby the head enters the locking window when the second arm is in the locked position to lock the first arm to the second arm.

9. A hitch mount for connecting a vehicle accessory to a vehicle hitch, said hitch mount comprising:
   a first arm configured to be received by the vehicle hitch; and
   an elongated second arm having a first end rotatably connected to the first arm, and a second end rotatably connected to the vehicle accessory, said elongated second arm having a locked position whereby the second arm is fixedly locked to the first arm and the vehicle accessory and an unlocked position whereby the second arm can rotate with respect to the first arm and the vehicle accessory;
   a locking window positioned in the second arm;
   a door plate connected to the second arm and spring biased to block the locking window; and
   a locking pin connected to the first arm and having an enlarged head to selectively engage the locking window, whereby the head enters the locking window when the second arm is in the locked position to lock the first arm to the second arm.

10. The hitch mount of claim 9, wherein the second arm is extended outward away from the vehicle at a lowered position in the unlocked position, whereby the vehicle accessory is on the ground; and the second arm is in a vertical position with respect to the vehicle and the first arm in the locked position, whereby the vehicle accessory is in a raised position adjacent the vehicle and off of the ground.

11. The hitch mount of claim 9, wherein the vehicle accessory comprises a cargo carrier having a plurality of wheels.

* * * * *